(12) United States Patent
Joshi et al.

(10) Patent No.: US 10,600,384 B2
(45) Date of Patent: Mar. 24, 2020

(54) ENERGY EFFICIENT POWER SEQUENCER CONTROL CIRCUIT

(71) Applicants: BARCO NV, Kortrijk (BE); BARCO CONTROL ROOMS GMBH, Karlsruhe (DE)

(72) Inventors: Mahesh Chandra Joshi, New Delhi (IN); Marcos Otero-Gensheimer, Karlsruhe (DE); Subhash Chandra Dhyani, Ghaziabad (IN)

(73) Assignees: BARCO NV, Kortrijk (BE); BARCO CONTROL ROOMS GMBH, Karlsruhe (DE)

( * ) Notice: Subject to any disclaimer, the term of this patent is extended or adjusted under 35 U.S.C. 154(b) by 686 days.

(21) Appl. No.: 15/310,987

(22) PCT Filed: May 13, 2015

(86) PCT No.: PCT/EP2015/060708
§ 371 (c)(1),
(2) Date: Nov. 14, 2016

(87) PCT Pub. No.: WO2015/173369
PCT Pub. Date: Nov. 19, 2015

(65) Prior Publication Data
US 2017/0084246 A1 Mar. 23, 2017

(30) Foreign Application Priority Data
May 14, 2014 (IN) .......................... 1286/DEL/2014

(51) Int. Cl.
*G09G 5/00* (2006.01)
*G06F 3/14* (2006.01)
(Continued)

(52) U.S. Cl.
CPC ............. *G09G 5/00* (2013.01); *G06F 3/1446* (2013.01); *G09F 9/33* (2013.01); *G09G 3/32* (2013.01);
(Continued)

(58) Field of Classification Search
CPC ...... G09G 5/00; G09G 3/32; G09G 2330/021; G09G 2330/02; G09G 2300/0265;
(Continued)

(56) References Cited

U.S. PATENT DOCUMENTS 5,644,174 A 7/1997 Cheng et al.
6,335,829 B1 1/2002 Van De Voorde
(Continued)

FOREIGN PATENT DOCUMENTS

EP 1238328 B1 5/2007
WO 01/67199 A1 9/2001
(Continued)

OTHER PUBLICATIONS

International Search Report (ISR) dated Sep. 7, 2015, for PCT/EP2015/060708.
(Continued)

*Primary Examiner* — Abhishek Sarma
(74) *Attorney, Agent, or Firm* — Bacon & Thomas, PLLC (57) ABSTRACT

An electronic system having an assembly of a plurality of electronic devices each driven by a local power unit and a power sequencer control circuit for controlling the power on or off operation of the local power units. The electronic devices can be for example display units of a display wall. An advantage of such an assembly, e.g. a tiled display or display wall, is that a low level or as little energy as possible is dissipated by the local power units such as DC power supplies associated with the electronic devices, e.g. tiles of a display, and the associated "housekeeping" electronics. A
(Continued)

further advantage is a limitation of the inrush current at start-up.

26 Claims, 8 Drawing Sheets

(51) Int. Cl.
 H05B 37/02 (2006.01)
 G09F 9/33 (2006.01)
 G09G 3/32 (2016.01)
 H02J 9/00 (2006.01)
(52) U.S. Cl.
 CPC ............ *H02J 9/005* (2013.01); *H05B 37/029* (2013.01); *G09G 2300/026* (2013.01); *G09G 2330/02* (2013.01); *G09G 2330/021* (2013.01)
(58) Field of Classification Search
 CPC .......... G06F 3/1446; H02J 9/005; G09F 9/33; H05B 37/029
 See application file for complete search history.

(56) References Cited

U.S. PATENT DOCUMENTS

| | | | |
|---|---|---|---|
| 6,501,195 | B1 | 12/2002 | Barton |
| 6,969,927 | B1 | 11/2005 | Lee |
| 8,446,046 | B2 | 5/2013 | Fells et al. |
| 2004/0075401 | A1 | 4/2004 | Segan et al. |
| 2005/0134525 | A1 | 6/2005 | Tanghe et al. |
| 2008/0067871 | A1* | 3/2008 | Black ..................... H05B 37/02 307/41 |
| 2008/0067959 | A1 | 3/2008 | Black et al. |
| 2009/0312884 | A1 | 12/2009 | Li et al. |
| 2010/0328849 | A1 | 12/2010 | Ewing et al. |
| 2011/0187332 | A1 | 8/2011 | Salvestrini |
| 2011/0267328 | A1* | 11/2011 | Venkatasubramanian ................... G06F 3/1431 345/211 |

FOREIGN PATENT DOCUMENTS

| | | |
|---|---|---|
| WO | 2008/033525 A2 | 3/2008 |
| WO | 2008/033526 A2 | 3/2008 |

OTHER PUBLICATIONS

Written Opinion dated Sep. 7, 2015, for PCT/EP2015/060708.
International Preliminary Report on Patentability (IPRP) dated Sep. 2, 2016, for PCT/EP2015/060708.
Second Written Opinion dated May 3, 2016, for PCT/EP2015/060708.
German Search Report dated Sep. 4, 2017, for DE 212015000103.2.
Knolles Elektronik Basteln p. 50, Einschalt-Sequenzer, pp. 1-5, 2006, retrieved from http://hobbyelektronik.de/praxis/projekte/einschalt-sequenzer/.
Office Action in related Chinese Application No. 201590000582.1, dated Mar. 26, 2018.
India Office Action in related India Application No. 1286/DEL/2014, dated Dec. 20, 2019.

* cited by examiner

ENERGY EFFICIENT POWER SEQUENCER CONTROL CIRCUIT

The present invention relates to an electronic system and method for operating the system comprising a plurality of electronic devices each driven by a local power unit and a power sequencer control circuit for controlling the power on or off operation of the local power units. The electronic devices can be for example display units of a display wall.

BACKGROUND

Display walls are used in different application areas, such as indoor and outdoor advertising, for events such as concerts, sport games or general entertainment. Display walls are available in different sizes up to ten or more square meters. Different content, such as video, text or graphics can be shown on display walls, both as static or moving images. Display walls are usually built by positioning display units next to each other.

For example, a display unit can be a liquid crystal display or a LED module. Examples of display walls comprising large numbers of LED modules are given in e.g. EP 1 238 328 B1 "Method of and device for displaying images on a display device", US2005/0134525 "Control system for a tiled large-screen emissive display" and US2009/0312884 "Method for power sharing and controlling the status of a display wall".

The display unit can also be a rear projection display. Example of display walls comprising a large number of rear projection display modules are given in e.g. U.S. Pat. No. 6,335,829 "Projection screen for image reproduction devices which are positioned next to and/or above one another". In this case, the display wall is a rear projection screen assembled from a plurality of rear projection screen panels. A supporting structure supports the screen panels and the projectors. In some instances, there may be one projector for more than one screen panels or one projector per screen panel. In any case, a large video wall will comprise at least 2 projectors.

Assembly and maintenance of large video walls both benefit from modularity. In a modular display walls, the display units are identical. In particular, each display unit has its own DC power source to power not only an image forming device; whether it is a projector, a LED panel or a liquid crystal display; but also among other things processing means to receive, process and/or send control and data signals and "housekeeping" electronics to, among other things, be able to turn on the display wall when it is in standby upon receipt of an instruction issued by a central command unit (e.g. a computer).

Since each display tile is preferably supplied with its own DC power supply, an alternating current power supply such as a 120 volt AC or 240 volt AC power distribution system can be provided for the display wall. Using an efficient switching DC power supply, each display tile will require more or less between 0.8 and 1 ampere of AC current, sometimes more. Using an efficient switching DC power supply, each display can require up to 400 W, for example depending upon the video content, hence the maximum current at low input AC voltage (120 V or less) can reach as much as 6 A. The DC power supply is often not 100% efficient and can dissipate power even when the image forming device is in standby mode. For example, a conventional HD Liquid Crystal (LC) Display can dissipate around 0.5 to 1 W. Assuming a display wall that includes one hundred twenty-eight display tiles, the current drawn in a stationary state in stand-by mode would be in the order of 64 to 128 W.

For large video walls, the power dissipation in standby mode becomes important enough to prevent the display wall from complying with "green" labels or eco-labels like e.g. EPEAT, Group for Energy Efficient Appliances Label, Energy Star . . .

When images are displayed, the typical current needed by e.g. a LED or LC display unit is 1 A but it can go up to 6 A depending upon the input AC voltage, video content and the type of display (LCD or Rear Projection). If all the tiles are switched on at the same time, the inrush current would be very large and the AC power supplies for the video wall display would have to be dimensioned accordingly. Large current fluctuations on the AC power supply line would also generate significant electromagnetic radiation that could interfere with e.g. digital devices, mobile phones etc . . .

SUMMARY OF THE INVENTION

The present invention relates to an electronic system comprising an assembly of a plurality of electronic devices each driven by a local power unit, and a power sequencer control circuit for controlling the power on or off operation of the local power units. While each electronic device can have its own local power supply, the invention applies equally to an assembly of electronic devices were a local power supply is shared by N electronic devices where N is smaller than M, M being the total number of electronic devices in the assembly. The ratio of M to N may be 3 or more, 5 or more or 10 or more.

The electronic devices can be for example display units of a display wall. An advantage of such an assembly, e.g. a tiled display or display wall in accordance with embodiments of the present invention is that a low level or as little energy as possible is dissipated by the local power units such as DC power supplies associated with the electronic devices, e.g. tiles of a display and the associated "housekeeping" electronics. A further advantage of embodiments of the present invention is a limitation of the inrush current at start-up.

According to embodiments of the present invention an assembly of electronic devices is provided and control and data signals are sent to the electronic devices. These control and data signals can be sent by a central processing or controlling unit. Each electronic device is preferably provided with access to a DC power supply whereby such a DC supply may be shared by N electronic devices where N is smaller than M, M being the total number of devices in the display assembly. The DC power supply may be connected to an AC power source. The DC power supplies can be powered up or down under the control of a power sequencer control circuit. For example, this can be done through a first relay or switch. The electronic devices can have processing means to receive, process and/or send the control and data signals and "housekeeping" electronics to, among other things, be able to turn on the device when it is in standby upon receipt of an instruction issued by a central command unit (e.g. a computer).

For example, according to embodiments of the present invention an electronic tiled display or a display wall can be formed of a number of display units. The display units are assembled to form a large display wall capable of displaying still and/or moving images or combinations of these. Control and data signals are sent to the display tiles. These control and data signals can be sent by a central processing or controlling unit. Each display unit is preferably provided with access a DC power supply. A DC power supply can be shared by N display units where N is smaller than M, M being the total number of display units in the display wall. The DC power supply may be connected to an AC power source. The DC power supplies can be powered up or down under the control of a power sequencer control circuit. For example, this can be done through a first relay or switch. When the first relay or switch is opened (i.e. when the electrical connection between the DC power supply and the AC power source is broken) the DC power supply does not dissipate any power.

The first relay or switch connecting the DC power supply of a display unit to the AC power source is preferably a latching relay. The use of latching relays has the advantage of reducing or minimizing the power consumption of the system especially in standby mode.

It is an advantage of the present invention that by using a latching relay, power dissipation associated with the activation and/or de-activation of the DC power supply of each display unit will occur only for limited time intervals and only when the tiled display is either put on standby mode or off standby mode. Indeed, where the relay switch has coils, power is dissipated in the relay coils for a brief instant only when the state of the relay (closed or open) is changed. The power dissipated for control of a display tile is therefore further reduced. This is particularly important for large tiled display comprising e.g. more than hundred display tiles.

The first relay or switch connecting the DC power supply of a display tile to the AC power source is preferably opened or closed at or near zero crossing of the AC power signal delivered by the AC power source. This prevents arcing when closing or opening the first relay or switch thereby preventing degradation of the relay or switch. Degradation of the relay or switch can cause (among other things) an increase of the resistance of the relay or switch in its closed state. Preventing degradation of the relay or switch therefore decreases power dissipation in the parasitic resistance of the first relay or switch.

Embodiments of the present invention may make use of one, some or all of:

Sequencing, or discrete supply, each to an individual display or daisy chaining of supply of power to the displays of a display wall Use of relays to connect/disconnect a load from an AC supply the connect/disconnect can be performed at zero crossing;

Use of relays that do not consume power continuously such as latching relays.

Restricting inrush current to a display wall while reducing or eliminating stand-by power dissipation in the control electronics.

Standard standby circuits such as used in television sets, are not acceptable in a large video wall because the power dissipation would be too high.

In a further aspect of the invention, a transducer or sensor can be used to detect the zero crossing of the AC power signal delivered by the AC power source to the DC power supply on a display tile. The transducer or sensor can be connected to a power supply such as the AC power source through a second relay or switch on each display tile. The second relay or switch is closed only at times when zero crossing must be detected. The transducer will not draw power unless a zero crossing detection is necessary and power dissipation will further be reduced.

The second relay or switch connecting the transducer to the AC power source is preferably a latching relay. The second relay or switch will thus not cause power dissipation unless its state must be changed. For example if the second relay or switch has coils, the energy use will be in the coils of the relay or for driving the conductor carrying control signals to the second relay or switch.

In a further aspect of the invention, the display wall has a processing means such as a microprocessor or a microcontroller or an FPGA or an embedded processor. For example, control signals sent to the processing means to signal that the state of the first relay or switch must be changed can be used to supply power to the processing means and the drivers used to control the first and second relays or switches.

It is an advantage of this aspect of the invention that the processing means and drivers used to control the second and first relay are powered intermittently. In particular, the processing means and drivers are powered only at times when the state of the first relay or switch must be changed.

In a further aspect of the invention, there are two control signals carried by distinct conductors. A first signal or "Standby" signal on a first conductor is used to signal that a DC power supply providing power to a display unit must be disconnected from the AC power source. A second signal or "Active" signal on a second conductor is used to signal that a DC power supply providing power to a display unit must be connected to the AC power source. The use of the signal lines for Standby and Active signals to power a standby circuit in a power board whereby each electronic device or display unit has a power board is a particular advantage of embodiments of the present invention. The power board is one implementation of a power sequencer control circuit as it controls the first and second relays. When daisy chained it also controls the sequence of connection of a display unit to the AC power source and thus reduces inrush current.

Both signals can be voltage signals. Both signals can be a sequence of signals or pulses or waves or a single pulse or wave. Both signals can be either at ground (the reference for voltage signals; the signal is said "low") or "high" i.e. at a voltage higher than ground (e.g. 9V).

For example, for simple operation, when the first signal is high, it signals that the first relay or switch must be opened. When the second signal is high, it signals that the first relay or switch must be closed.

When one of the signals is high, it can be used to power the processing means and the drivers used to control the first and second relays or it can be inputted to a DC voltage regulator that generates a regulated supply voltage and supplies power to the processing means and drivers used to control the first and second relays. Each of the conductors carrying either the first or second signal can be connected to the input of a regulated power supply. This connection can be by the intermediary of a diode. The diodes prevent a short circuit when the first and second signals assume different states (e.g. the first signal is low and the second signal is high).

In a further aspect of the present invention, the first or second signal is kept high no longer than necessary to put the display wall in standby mode or to bring it out of standby mode.

When the state of the first relay or switch must be changed, one of the signals is set high and is kept high long enough to power the processing means and the drivers used to control the first relay until the state of the first relay or switch has been changed.

When the state of the relay or switch has been changed, both the first and second signals are at ground level and no power is available to the processing means and the driver used to control the state of the first relay thereby bringing power dissipation to a minimum (for example nil) until the state of the first relay or switch must be changed again.

In a further aspect of the invention, the DC power supplies can be powered up or down by a power sequencer control circuit. For example the power sequencer control circuit can be such that the time at which the DC power supply associated with a display unit is connected to or disconnected from the AC power source depends on the state of the DC power supply of at least another display unit of the tiled display. For example, the time at which the first relay or switch connecting the DC power supply associated with a display unit to the AC power source is opened or closed is made to depend on the state (open or closed) of the first relay or switch associated with at least another display unit of the tiled display. For instance, the power sequencer control circuit can be such that when the assembly of electronic devices is powered-up, the local DC power supplies of the electronic devices can be powered up sequentially (i.e. one after the other). Or the power sequencer control circuit can be such that the local DC supplies associated with the electronic devices can be powered up in a random order or in any other planned order. The power sequencer control circuit can power up the local DC power supplies associated with the electronic devices sequentially in groups of electronic devices, e.g. in a group size that is 20% or 10% of the total number of electronic devices or less; and greater than 1% or 5% of the total number of electronic devices.

For instance, the power sequencer control circuit can be such that when the tiled display is powered-up, the first relays or switches associated with the display units can be closed sequentially (i.e. one after the other). Or the first relays or switches associated with the display units can be closed in a random order or in any other planned order. The first relays or switches associated with the display units can be closed sequentially in groups of display units, e.g. in a group size that is 20% or 10% of the total number of display units or less; and greater than 1% or 5% of the total number of display units. The inrush current drawn by the tiled display will in all of these cases be less than if the first relays or switches associated with all of the display units are closed simultaneously. This will not only decrease electromagnetic radiation by the cables carrying power to the display, it will also enable the use of AC power sources unable to cope with otherwise large inrush currents.

In a further aspect of the present invention, the display units have power boards. For example, the power sequencer control circuit can be such that the first and second signals received by an $i^{th}$ power board can be sent to the $(i+1)^{th}$ power board under control of the $i^{th}$ power board. The first and second signals received by an $i^{th}$ power board can be sent to the $(i+n)^{th}$ power board under control of the $i^{th}$ power board, whereby the value of n is chosen for each board so that finally all are switched on.

It is an advantage of that aspect of the present invention that for some embodiments no central control will be needed to sequence the closing or opening of the first relays or switches associated with different display units thereby limiting the risk of large inrush current if the central controlling unit were to malfunction. In other words the power sequencer control circuit can be preferentially a distributed function rather than a centralized function.

For example, in a further aspect of the invention, the display tiles are daisy-chained. The "Standby" and "Active" signals are relayed by each power board to the next power board. Hence the power sequencer control circuit in this embodiment includes a daisy chain arrangement.

The power sequencer control circuit can be implemented in a variety of distributed designs. For example, the central controlling unit can send control and data signals to a first power board (associated with at least one display tile), the first power board relaying the control and data signals to a second power board, in any preprogrammed sequence etc . . . It is an advantage of that aspect of the invention that this particular configuration may contribute to guarantee that the first relay or switch on the $i^{th}$ power board will not be closed or opened at the same time as the first relay on the $(i-1)^{th}$ power board tile and/or that the first relay on the $i^{th}$ power board will not be closed or opened too soon after the first relay on the $(i-1)^{th}$ power board thereby preventing large inrush current and/or large variation of the current in the AC supply line that would generate electromagnetic disturbances.

DETAILED DESCRIPTION OF THE INVENTION

According to embodiments of the present invention an assembly of electronic devices is provided and control and data signals are sent to the electronic devices. These control and data signals can be sent by a central processing or controlling unit. Each electronic device is preferably provided with access to a or its own DC power supply. The DC power supply may be connected to an AC power source. The DC power supplies can be powered up or down under the control of a power sequencer control circuit. For example, this can be done through a first relay or switch. The electronic devices can have processing means to receive, process and/or send the control and data signals and "housekeeping" electronics to, among other things, be able to turn on the device when it is in standby upon receipt of an instruction issued by a central command unit (e.g. a computer).

While reference will be made in the description to LED tiled display walls, the present invention is not limited thereto but has a more general application. For example, the present invention includes within its scope display walls made by assembling rear projection modules next to each other, each rear projection module (also known as "cube") comprising a rear projection screen, a projector unit and the associated DC power supply and control electronics.

The present invention also apply to other types of emissive displays tiled to form a display wall like e.g. OLED displays, liquid crystal displays etc . . .

The invention also applies to other types of devices connected to an AC power supply with the same advantages and benefits. For instance, instead of display units, the devices can be lighting devices. The devices need not be identical and they do not need to provide the same function. For instance, the devices might be computing devices like e.g. desktop computers; displays like e.g. CRT or LCD screens connected to the desktop computers; memory devices like e.g. networked Hard Disk units; network routers . . .

While the description will be made for display walls where each tile has its own DC power supply, the invention applies equally to display walls were a DC power supply is shared by N display units where N is smaller than M, M being the total number of display units in the display wall. The ratio of M to N may be 3 or more, 5 or more or 10 or more.

Advantageous features of any or all of the embodiments of the present invention include:

Use of a latching relay to provide power to a display

Control circuitry that is supplied by control signals with zero dissipation when control signals are not "active" e.g. high.

Use of relays with no continuous power requirement such as latching relays. Such relays do not have the disadvantage that power is still dissipated in the relay which would require the use of transistors that are supplied continuously to keep relay in the desired state.

Sensors need only be connected only at zero crossing and dissipating some energy is required only at zero crossing, whereby a relay such as a latching relay can be used again (to connect the sensor) to avoid dissipation in relay.

A fail-safe, built-in distribution of sequenced signals.

The control circuit is conditionally supplied with power.

First embodiments of the present invention will be described with reference to FIGS. 1 to 5 and 8.

As will be described with reference to FIGS. 1 to 5 and 8, and best shown in FIG. 1, a display wall or tiled display 1 according to this embodiment of the invention comprises at least two display units 2 and 3. What is described for the following embodiments applies equally well to other systems, e.g. if the display units are electronic devices of an assembly, such assemblies in included with the disclosure of this invention.

Figure 1:
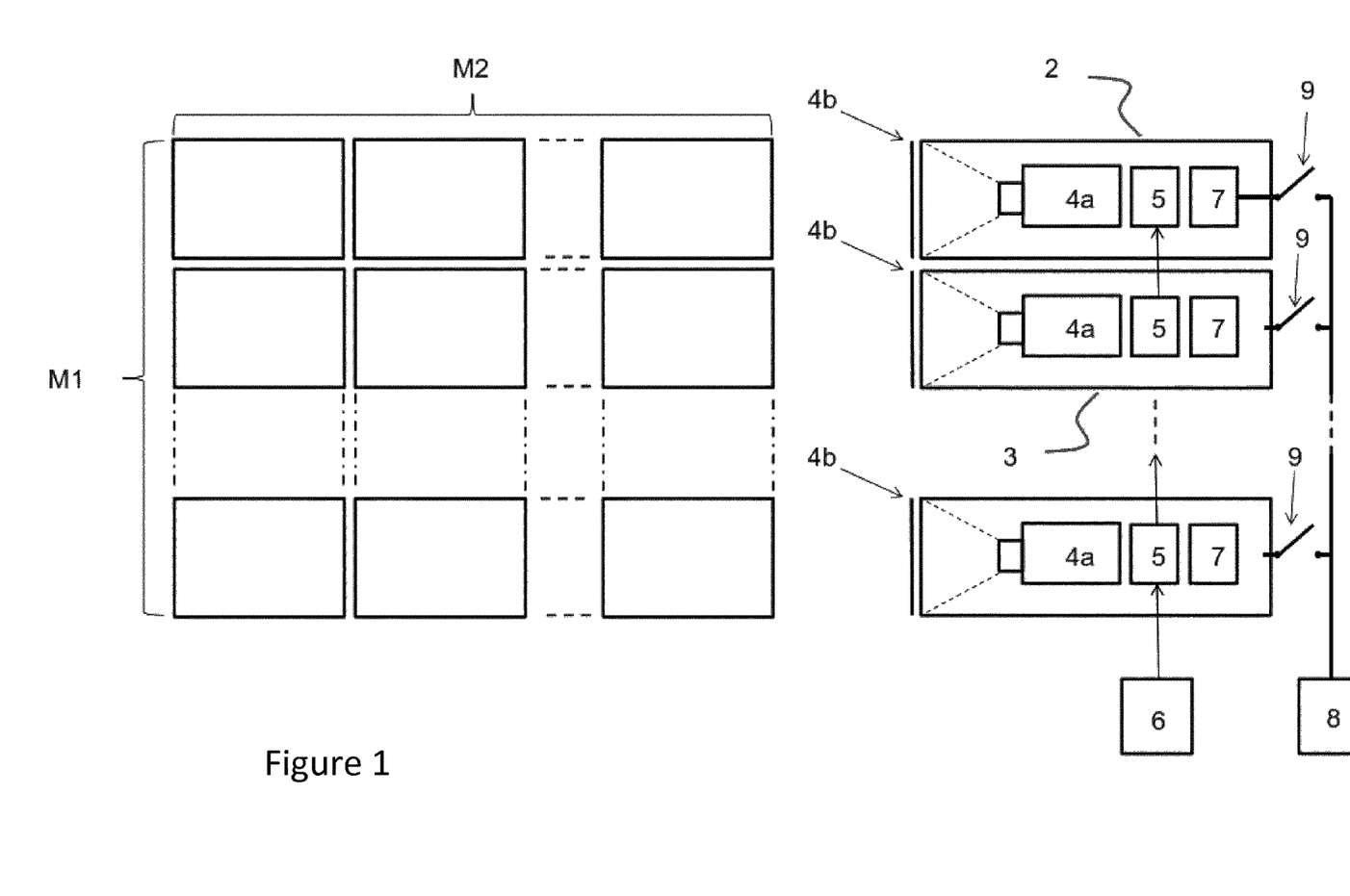
FIG. 1 is a schematic diagram of a display for use with embodiments of the present invention.

FIG. 1 shows a tiled display with M1 rows of M2 display units (M1 and M2 being integer numbers larger than 0). Each display unit comprises an image forming device 4. The image forming device 4 can be, for example, a set of LEDs, a liquid crystal display or a rear projection apparatus (projector 4a and a screen 4b as seen on FIG. 1) or similar. Each display unit can have processing means like e.g. a microprocessor, FPGA, microcontroller or embedded processor system 5 to process signals like control signals and data signals (in particular image data signals). The signals to be processed by the processing means 5 come from another tile such as a neighboring tile and/or a central general processing unit 6 like e.g. a computer system that controls operation of the display wall 1. Each group of N display units (N being smaller than the total number M=M1×M2 of display units in the display wall) has a DC power supply 7. For the sake of clarity, the description of the invention will be done for N=1. Alternatively the ratio of M to N can be for example 3 or more, or 5 or more or 10 or more.

The DC power supply 7 is connected to an AC power source 8 by means of a switch such as a relay 9.

The efficiency of a DC power supply is less than 100%. Therefore, even when no power is drawn from the DC power supply by the display unit, it will dissipate power.

When a display unit is not used, its DC power supply can be disconnected from the AC power supply by opening the relay 9 associated to that DC power supply and display unit. This has the advantage of reduced power consumption.

With a conventional relay, power is dissipated to maintain the relay in a given state. For large video walls, the power dissipated by M relays 9 can be large enough to disqualify the display wall from its eco or green label. A similar problem would exist if semiconductor switches were used. To solve this issue, latching or pulse relays are used to limit the power dissipated in the relays.

A relay is an electrically operated switch. Many relays use an electromagnet to mechanically operate a switch, but other operating principles are also used, such as solid-state relays.

Solid-state relays can be used to control power circuits without having any moving parts. Instead they use a semiconductor device to perform switching. A latching relay has two relaxed states (bistable). These are also called "impulse", "keep", "stay" or sometimes "polarized" relays all of which are included in the term "latching relay. With a latching relay, when the current to operate it is switched off, the relay remains in its last state. This is achieved e.g. with a solenoid operating a ratchet and cam mechanism, or by having two opposing coils with an over-center spring or permanent magnet to hold the armature and contacts in position while the coil is relaxed, or with a remanent core. In the ratchet and cam example, the first pulse to the coil turns the relay on and the second pulse turns it off. In the two coil example, a pulse to one coil turns the relay on and a pulse to the opposite coil turns the relay off. This type of relay has the advantage that one coil consumes power only for an instant, while it is being switched, and the relay contacts retain this setting across a power outage.

The relay 9 is for instance a DE1A from Panasonic.

Each of the relays 9 is associated with a power board 10. The power board can be any device built around a latching relay 9 and that can connect or disconnect the DC power supply 7 powering a display unit from an AC power supply 8, e.g. when requested by a central control unit (e.g. a general processing unit 6) or another unit. In its simplest embodiment, the power board 10 is limited to a latching relay 9 and connectors assembled on a printed circuit board. Signals to control the relay are then generated by a general processing unit 6 (or a control board as will be discussed further below) without intermediary. In a more general case, the power board 10 has processing means 11, relay drivers 12 (e.g. current driver) to send a pulse to the relay 9 under the control of the processing means 11 and its own DC power supply 13 distinct from the power supply 7. This power supply 13 powers the processing means 11 and the relay drivers 12. The power rating of this power supply 13 is lower than that of the power supply 7.

Opening and closing the relay 9 is preferably done at or near the zero crossing of the AC signal, i.e. zero crossing of the voltage, i.e. the instantaneous point at which there is no voltage present. This avoids arcing which can degrade the relay contacts. For example the ON resistance can increase which would contribute to power dissipation. Depending on the load, there may be a phase shift between voltage and current zeroes Zero voltage switching assists in reducing inrush and EMI issues for large systems and assists in providing very low standby power requirements <0.7 W with a single ON/OFF control complying to Energy Star requirements.

Figure 3:
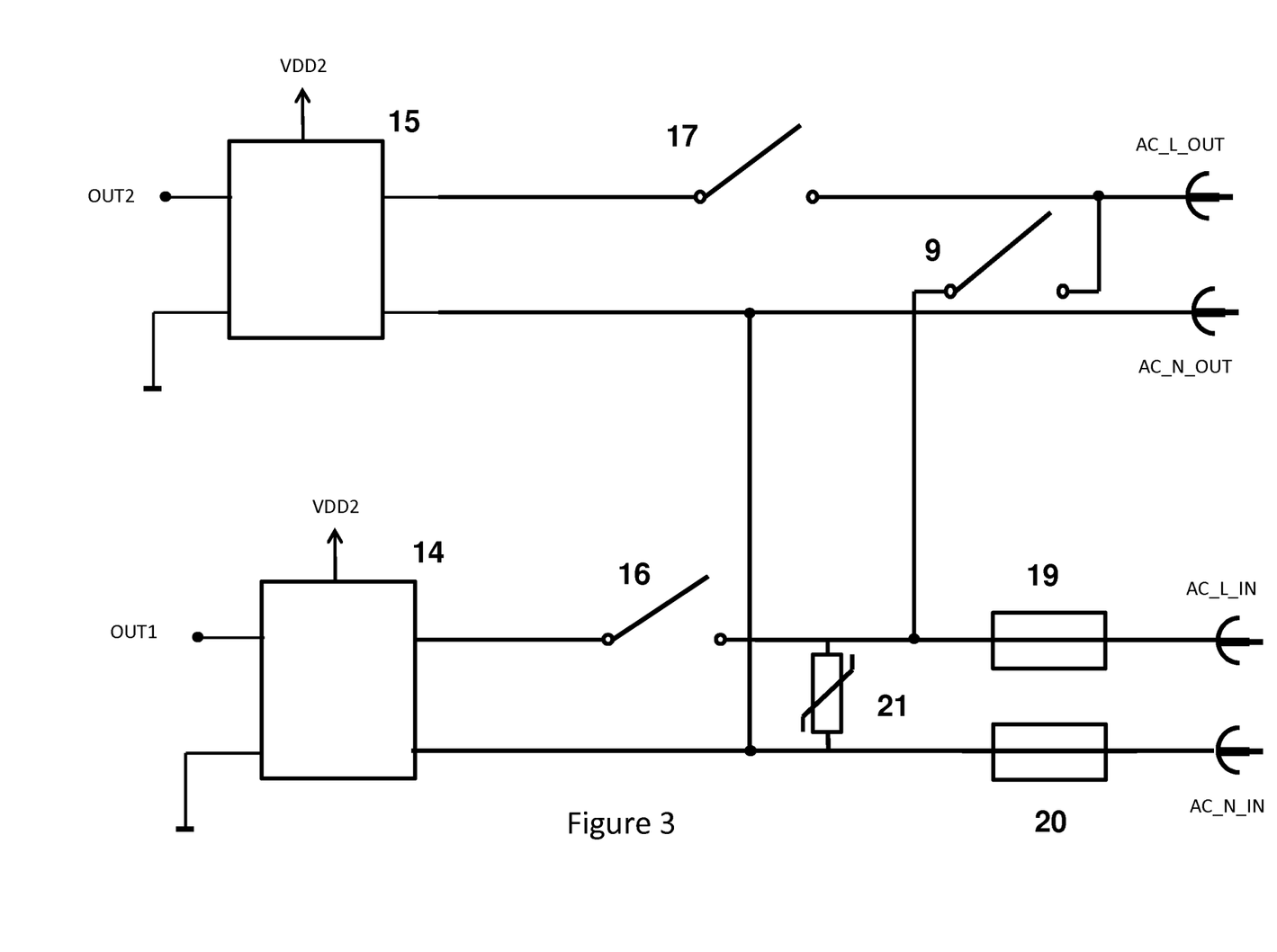
FIG. 3 is a schematic diagram of the connections between zero crossing detectors and first relay in an embodiment of the present invention.
Figure 8:
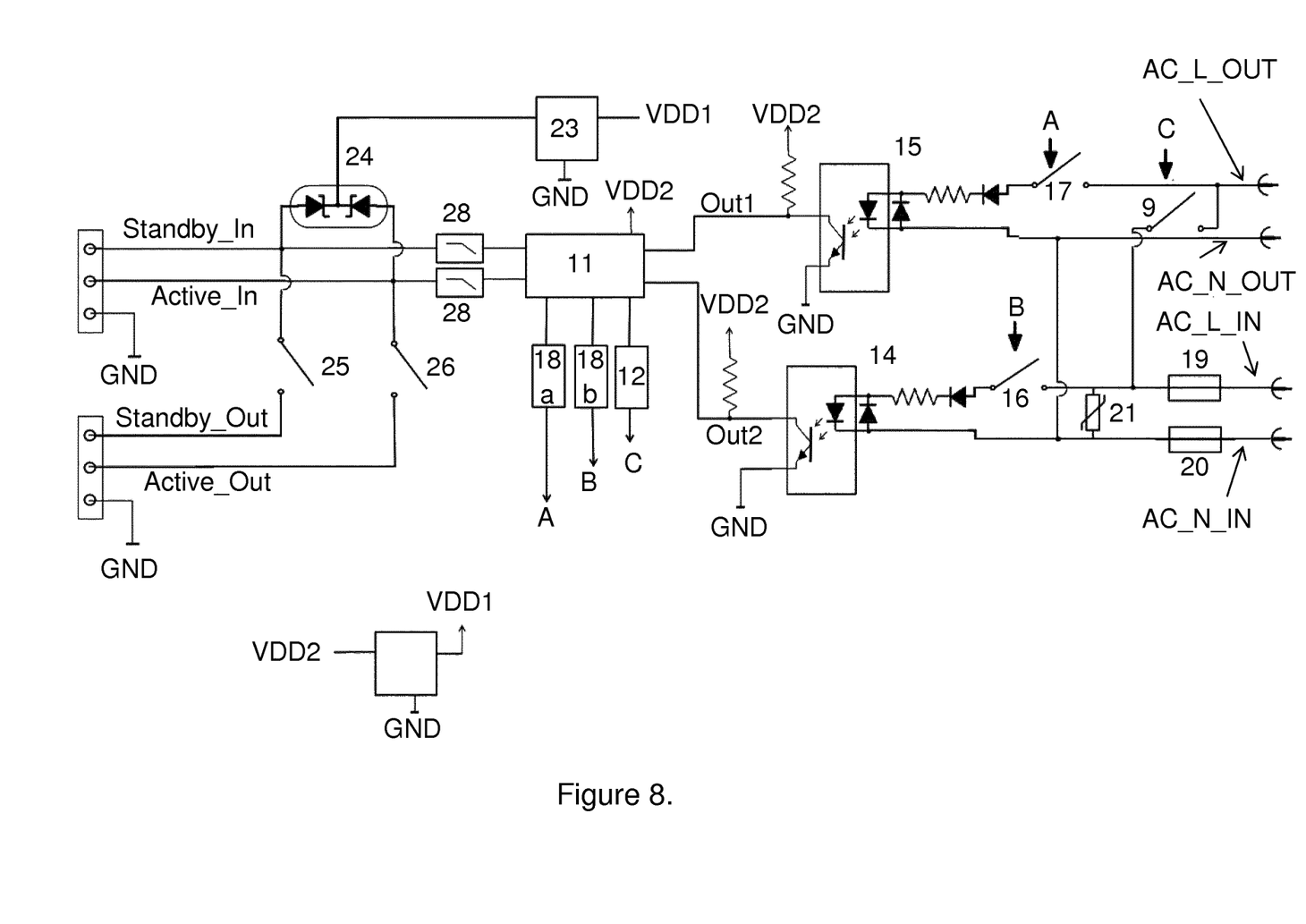
FIG. 8 shows how the circuits of FIGS. 2-4 can be combined in accordance with an embodiment of the present invention.

Although the sensor circuit of FIG. 3 or FIG. 8 is better adapted at sensing a voltage than a current it can be adapted to detect zero current crossing as an alternative embodiment. In some instances, voltage zero crossing is out of phase with current zero crossing. In such instances, opening the relay at a zero voltage might result in arcing.

Zero voltage switching prevents among other things arcing and degradation of the relay (including its resistance) which in turn would lead to an increase of power dissipation in the relay 9. The processing means 11 can detect zero crossing by means of two zero crossing sensors 14 and 15 connected to the AC power supply respectively up-stream and down-stream of the relay 9.

When the relay 9 is open, the upstream sensor 14 is used to detect the zero crossing. When the relay 9 is closed, the downstream sensor 15 is used to detect the zero crossing. Two sensors are advantageously used to take the influence of parasitic components on the phase signal into account. There are for instance the parasitic components of relay 9, fuses 19 and 20, voltage dependent resistor 21 used as a transient surge suppressor . . .

A zero crossing sensor can for instance be an opto-coupler connected to the AC signal via a resistor and a diode. Schematics for such a sensor are given on FIG. 2 as an example.

The opto-coupler is for instance a CNY17F-1 from Vishay.

The sensors 14 and 15 will dissipate power even when they are not used to detect zero crossing.

To limit power dissipation, the sensors 14 and 15 are connected upstream and downstream of relay 9 by means of 2 relays 16 and 17 as seen on FIG. 3. When zero crossing detection is not required, the relays 16 and 17 are opened. The relays 16 and 17 are advantageously latching relays. The relay drivers 18a and 18b for relays 16 and 17 are on the power board 10 and are controlled by the processing means 11.

Fuses 19 and 20 are positioned in series with the input AC power signals AC_N_IN and AC_L_IN. A surge suppressor like e.g. a varistor 21 connected between the input AC power signals AC_N_IN and AC_L_IN can offer some protection to the sensors 14 and 15 and the DC power supply. The DC power supply 7 powering a display unit is connected to the AC power supply via the connections AC_L_OUT and AC_N_OUT and the relay 9.

The signals OUT1 and OUT2 generated by the sensors 14 and 15 are used to determine the best instant (at or near zero crossing) to change the state of relay 9.

In one embodiment, the signals OUT1 and OUT2 are either used as interrupt signal or are polled by processing means 11 on the power board 10. An example of power board is given on FIG. 4. An ultra-low power mixed signal microcontroller like e.g. the MSP430G2302 from Texas Instrument is used for signal processing and generation of control signals (in particular the signals that will control the relays 9, 16 and 17). The power board 10 is connected to a control board 22. The control board 22 can for instance send a request to power board 10 to put the associated display unit in standby mode or in active mode. Upon receipt of a "Standby" or "Active" instruction, the processing means 11 close either relay 17 or relay 16 to determine the best instant (at or near zero crossing) to open or close relay 9. The processing means 11 then generate a pulse with help of a driver to change the state of relay 9.

Figure 4:
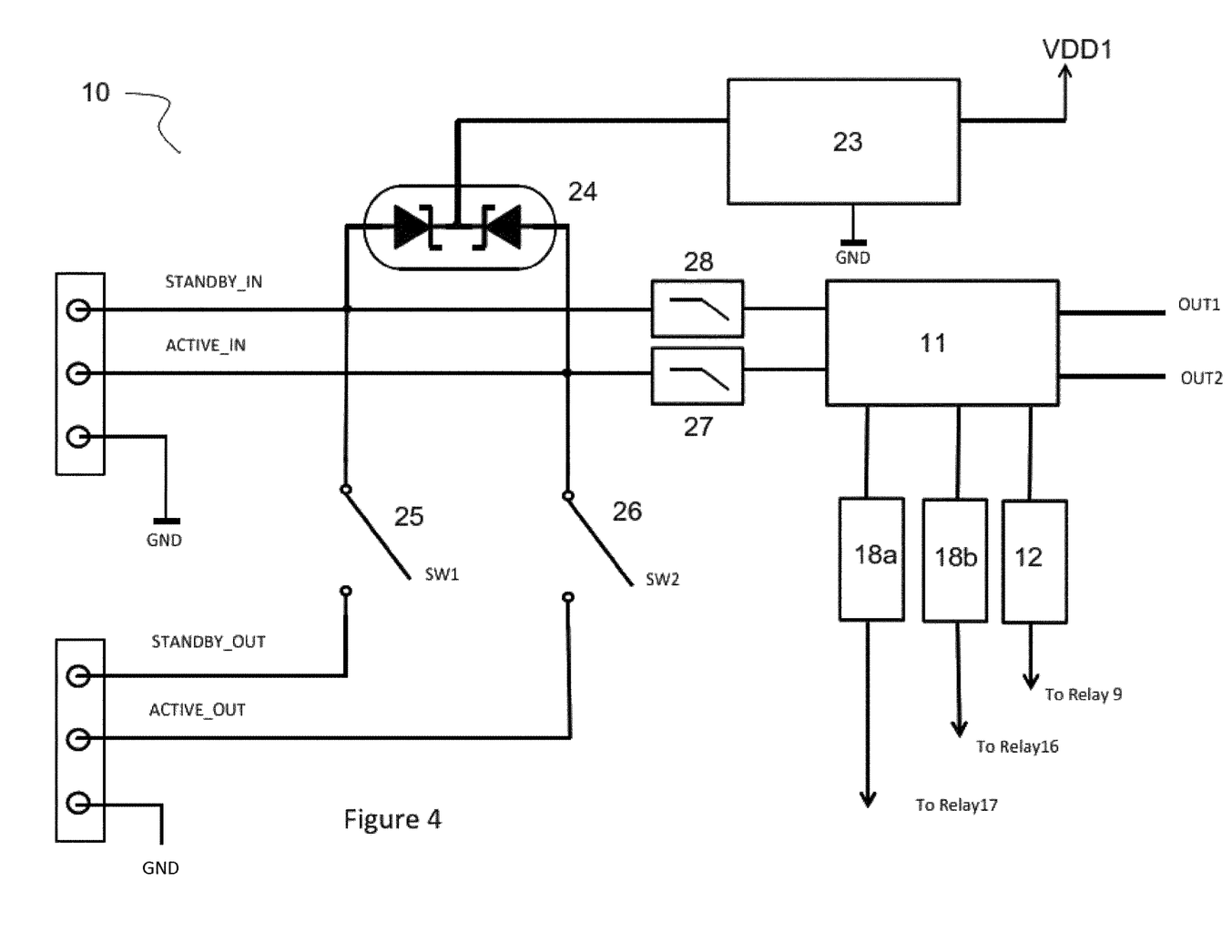
FIG. 4 is a schematic representation of a power board according to an embodiment of the present invention.

Once the state of relay 9 has been changed, the processing means 11 generate a pulse with help of a current driver to open the relay 16 or 17 that was closed for detection of zero crossing and thereby prevents useless dissipation of power in the sensor 14 or 15.

The instructions can be sent to a power board 10 over a wired or wireless communication link. The instructions can be sent in parallel to the power boards or they can be sent to a first power board that will relay them to the next power board in a daisy chain configuration.

To limit the complexity (and power dissipation) of the communication link, the instructions to the power board can be limited to "Standby" and "Active" only. The two signals are then preferably sent over distinct conductors.

The Standby and Active signals are in a first binary state such as low (at electrical ground level corresponding to the ground GND of the power board) when the state of relay 9 must not be changed.

The "Standby" or the "Active" signal is set at a second binary state such as high (at a voltage different e.g. higher than ground) when the state of relay 9 must be changed i.e. when the power board 10 must be powered to change the state of relay 9.

The first signal or "Standby" signal on a first conductor is used to signal that the DC power supply providing power to a display unit must be disconnected from the AC power source. The second signal or "Active" signal on a second conductor is used to signal that a DC power supply providing power to a display unit must be connected to the AC power source.

Both signals can be voltage signals. Both signals can be either at ground (the reference for voltage signals) or "high" i.e. at a higher voltage than ground.

When the first signal is high, it signals that the first relay 9 must be opened and the DC power supply 7 connected to the AC power source.

When the second signal is high, it signals that the first relay 9 must be closed and the DC power supply 7 disconnected from the AC power source.

As will now be described, the conductors carrying the "Standby" and "Active" signals can be used to power the power board 10.

When one of the signals is high, it is used as input to a DC voltage regulator that generates a regulated supply voltage and supplies power to the processing means and drivers used to control the first and second relays on the power board.

The conductors carrying the Standby and Active signals are both connected to a DC voltage regulator 23 (that voltage regulator is distinct from the DC power supply powering the display unit). The connection is made through diodes 24 as seen on FIG. 4 in order not to create a short circuit between the conductors carrying the Standby and Active signals.

The voltage regulator 23 generates a stable supply voltage VDD1 e.g. 5V. The voltage VDD1 can be fed to a second voltage regulator 29 generating a second stable supply voltage VDD2 e.g. 3.3V to power the processing means and the zero crossing sensors 14 and 15. The diodes 24 can for instance be a BAT120C Schottky barrier double diode available from e.g. NXP Semiconductors.

To further limit power dissipation when the state of relay 9 must not be changed, the Standby or Active signal used to power the power board 10 is kept high no longer than it is necessary to put the power boards in standby or bring them out of standby. Once the state of the first relays in the display wall has been changed, the power board need not be powered anymore. This is achieved by bringing either of the Standby or Active signal back to the ground level and keep them both at ground level until the state of the first relays must be changed again.

Power is thus available to the power board only when either the "Standby" or "Active" signal is high. If the time interval during which either the "Standby" or "Active" signal is kept high is limited to the time interval required to change the state of the relay 9 on every power board 10 in the display wall, there is thus an automatic overlap between the time interval required to change the state of relay 9 and the time interval during which energy is dissipated by the power board 10. In standby mode for instance, power dissipation by the so called "standby circuit" in a run-of-the-mill High Definition Liquid Crystal Display is 0.5 to 1 W. For large video walls comprising e.g. 128 displays positioned next to and/or above one another, the power dissipation in standby mode would be at least 64 W. With the current invention, power dissipation in the display unit and associated housekeeping electronics (aka the standby circuit) is null. Power dissipation in standby mode is limited to the power dissipation of the control board 22 and/or the general processing unit 6 controlling the operation of the display wall and remains thus under the 1 W required from electronic appliances like e.g. personal computers when they are in standby mode.

Once either the "Active" or "Standby" signal is high, power is available to the processing unit 11. Once powered, the processing means verify the state of the Active and Standby signal lines. This is preferably done after filtering of the signals by filters 27 or 28. A typical filter comprises a resistive divider, a low pass filter and a Zener diode with a Zener voltage equal to the supply voltage VDD2 supplying power to the processing means. The processing means can be a programmable device like a microcontroller or a microprocessor e.g. MSP430G2102 available from Texas Instrument. The processing means can also be non-programmable like e.g. an hardwired "state machine" and associated logic gates.

After having verified the state of the Active and Standby signals, the processing means 11 then determine whether the relay 9 must be opened or closed. The processing means determines the duration and the instant at which a pulse must be sent to the relay 9 in function of the voltage at the output of sensor 14 or 15 and the characteristics of the first relay 9. The duration of the pulse can be determined beforehand and stored as a constant in the program executed by the processing means 11. Most microprocessors use as processing means 11 are not able to source and/or sink enough current to directly drive a relay like relay 9. In general a relay driver 12 will act as buffer between the processing means and the relay.

Figure 5:
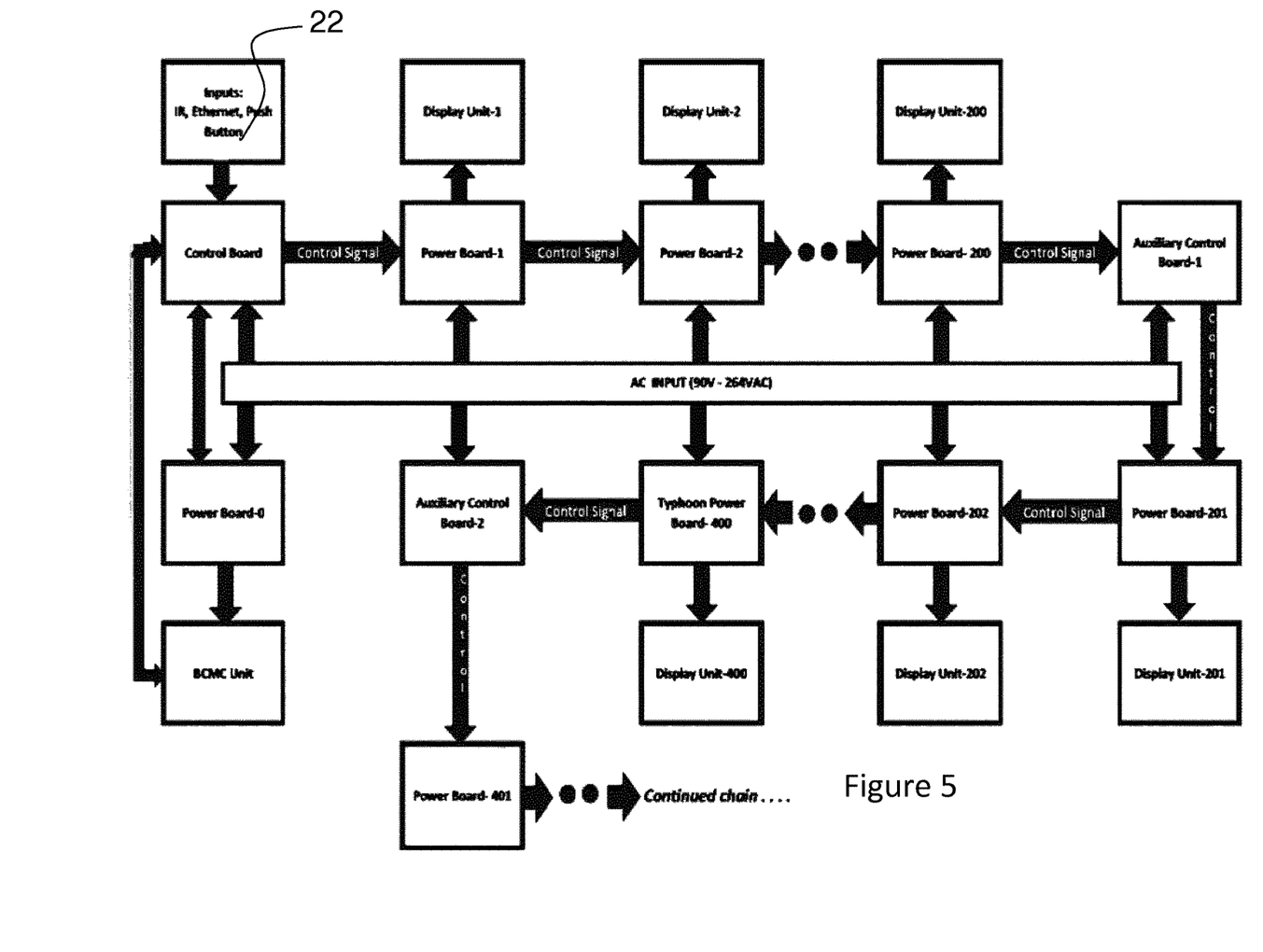
FIG. 5 is a schematic representation of an embodiment of the present invention in which the power boards are daisy chained.

In a display wall, several power boards can be daisy chained as illustrated on FIG. 5. In that particular example, each display unit is associated with its own power board. The power boards connect the DC power supply of the display units to an AC power source. The power boards are controlled by a control board that sends them a signal to connect the DC power supply of a display unit to the AC power source or to disconnect them from the AC power source.

Daisy chaining of the power boards gives better control on the sequential closing or opening of the relays 9 on each power board. Indeed, it guarantees that the relays will not be opened or closed at the same time, even in the event of a processing means malfunction, the standby and active signals will never be received simultaneously by all power boards. This will help prevent surge currents when the display wall is activated or put in standby mode.

In a daisy chain of power boards, a first power board "Power Board-1" is connected directly to a control board by means of at least three wires: a first wire carries the "Standby" signal, a second wire carries the "Active" signal and a third wire carries a GND signal.

The "Standby" and "Active" signals are relayed by the first power board "Power Board-1" to a second power board "Power Board-2". The "Standby" and "Active" signals are relayed by the n-th power board "Power Board-n" to the (n+1)th power board "Power Board-n+1". The GND signal can be connected "in parallel" to all power boards or it can be relayed by a power board to the next power board in the daisy chain.

In the example of FIG. 4, the "Standby" and "Active" signal are transmitted to the next power board by means of switches 25 and 26 controlled by the processing means 11. As long as the switches 25 and 26 are open, no power can be made available to the next power board guaranteeing that it will not be able to change the state of the next first relay 9 thereby preventing the relays to close or open simultaneously.

As seen on FIG. 5, the "Standby" and "Active" signals can be generated either by a Control Board or a central controlling unit 6 (BCMC on FIG. 5). The Control Board can receive instructions from a user with help of a push button and generate the signals "Standby" and "Active" accordingly to change the state of the relays 9 to put the display wall in standby mode or in active mode. A user can also input command through an Ethernet link or an infrared (IR) remote control.

The Control Board can also receive instructions from the central control unit 6 (BCMC) under direct command of a user or according to an executable program running on the central control unit 6.

For very large display walls with large numbers of display units and power boards, the signals "Standby" and "Active" may need to be restored or amplified by an auxiliary control board.

As indicated above and also described below with respect to FIGS. 6 and 7, the latch relay 9 controls the AC supply to the load, i.e. a display or display tile. The processor 11 is supplied by regulator 23 or 29. For example, the voltage supply VDD1 can be used to actuate the relays and the voltage supply VDD2<VDD1 can be used to supply the processing means, the sensors etc . . . Depending on the processor used in the processing means, all circuit components could be supplied by voltage supply VDD1 only. VDD1 is generated by regulator 23, power is provided to regulator 23 by standby in and/or active in. A short circuit between standby in and active in is excluded by diodes 24. Processing means 11 will only be supplied if at least one of standby in or active in is high. If both signals are low, VDD1 and VDD2 are low and the processing means is not powered.

An advantage of this arrangement is that it prevents the processor from changing the states of relays 25 and 26 that forward the signals standby in and active in to the next "power board". The next power board being supplied by these signals, the next processing means will not be powered and hence will be incapable of closing the next relay 9 and so on for each new power board. This arrangement takes care of sequencing of powering up and prevents all loads to be connected to the AC power supply at the same time thereby avoiding excessive inrush current and limiting EMI.

In this arrangement the processing means are powered down (entirely) when not used. This is a fail-safe measure to avoid an unwanted change of state of relay 9. Furthermore, it further reduces the power dissipation because even with the processing means in sleep mode, the regulator 23 would still have to provide a regulated supply voltage for the processing means. This is avoided in this arrangement by powering down the processing means completely.

In the previous embodiment, the contact between the AC Line AC_L_IN and the upstream sensor is done through relay 16. The Neutral wire, AC_N_IN is always connected (it is used as reference). In this previous embodiment, it is preferred if the Live or Hot wire ACL_IN and the neutral AC_N_IN are not allowed to be interchangeable. In the previous embodiments, if AC_L_IN and AC_N_IN are swapped, the relay 9 is connected to AC_N_IN. Therefore, when receiving a standby command/signal to open relay AC_N_IN will be disconnected but AC_L_IN will still be connected. This could happen in electrical systems where mains power is supplied via stop contacts where the earth pin is not available in a power socket and the plug can be inserted in both directions.

While this is not necessarily a problem, it can nevertheless be a concern because of some leakage current which can flow between AC_L_IN and the ground or earth of the user products via Y2 EMC filter capacitors inside them, such as usually inside power supplies. For a single display 4b, the leakage current might be negligible but for large video wall systems with hundreds of displays, the leakage current may become incompatible with the low power dissipation required in standby mode of <0.7 W.

Further embodiments of the present invention will be described with reference to FIGS. 6 and 7 in order to still share all advantages of the previous embodiments even where plugs and sockets allow AC L & N swap conditions. To achieve this switches are used that interrupt both AC L & N in standby mode. For example an embodiment is described with a 2 pole relay instead of 1 pole relay (RL1) in previous embodiments. In such an embodiment, RL1 is now replaced with 2 sets of contacts. One set of contacts is used to cut the L and the other is used to cut the N lines.

With the exceptions noted above and explained in more detail below the scheme and/or the sequence of events, operation of relays named as RL1 & RL2 of the previous embodiments still remain same in this embodiment. Essentially, hardware of this embodiment has been altered to support L & N reverse connections. To solve this problem, in accordance with a further embodiment of the present invention the circuit of FIG. 3 is modified as seen on FIG. 6. The circuit of FIG. 6 can be seen to have many similarities with FIG. 3.

Relays 309 and 32 are driven by the same signal and they are in the same open or closed state at the same time. If relays 309 and 32 are open, neither AC_L_IN nor AC_N_IN are connected to AC_L_OUT and AC_N_OUT.

If relays 309 and 32 are closed, AC_L_IN will be connected to AC_L_OUT and AC_N_IN will be connected to AC_N_OUT and whether or not Neutral and Live wire have been swapped at the inputs AC_L_IN and AC_N_IN, the load connected to AC_L_OUT and AC_N_OUT will be supplied.

Relays 33 and 31 are driven by the same signal and they are in the same open or closed state at the same time. If relay 31 is open, neither the upstream sensor 314 nor the downstream sensor 315 dissipate power as desired to limit power dissipation in the sensors when no zero crossing measurement is required.

If relay 31 is closed while relays 309 and 32 are open with relays 31 and 32 being connected in series between the upstream and downstream sensors 314 and 315; the upstream sensor 314 would not be connected to AC_N_IN if relay 33 were not there to make the contact. This explains why relays 32 and 33 are connected in parallel between relay 31 and AC_N_IN.

Figure 2:
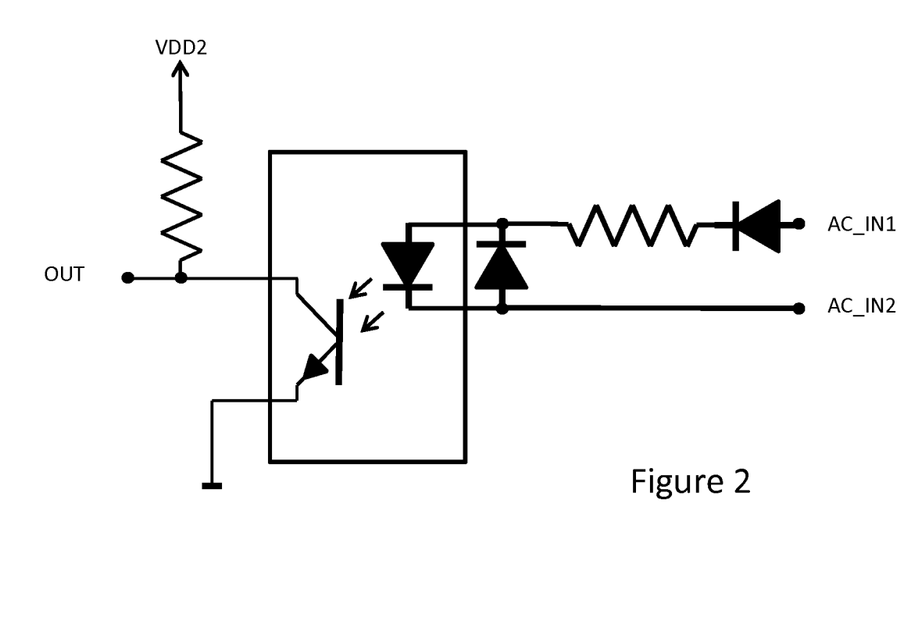
FIG. 2 is an example of zero crossing detector.

The upstream and downstream sensors 314 and 315 can be different from the equivalent sensors disclosed with reference to FIG. 2. An additional resistor can be connected with the diodes in order to bias and limit sensing currents towards sensors 314 and 315.

Figure 6:
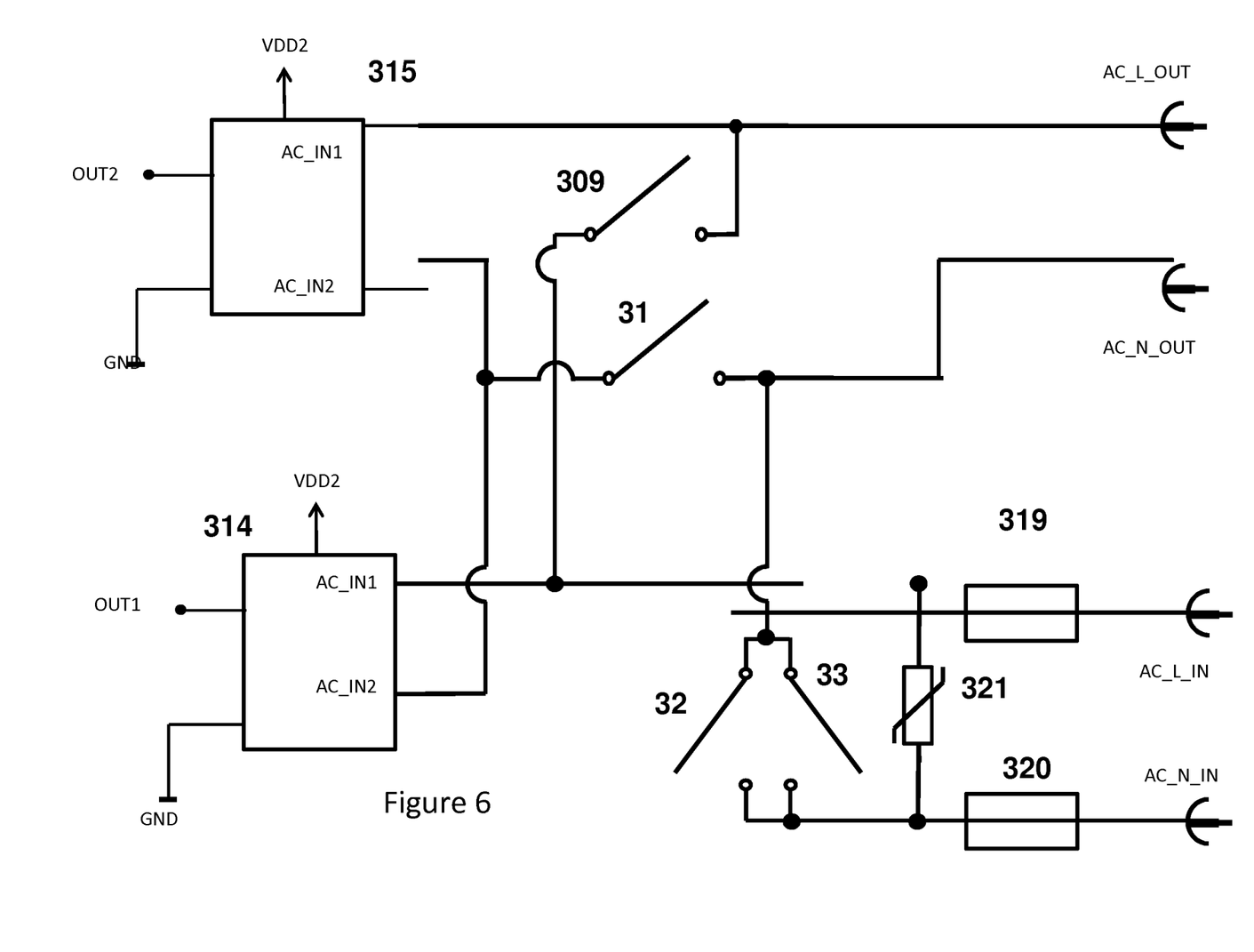
FIG. 6 is a schematic diagram of a further display for use with embodiments of the present invention.

If the circuit of FIG. 6 is used instead of the circuit of FIG. 3, the sequence of operations to put a display unit in standby mode or active mode is identical to what has been described for previous embodiments:

Initially all relays are OFF.

Turn ON relays 31 and 33.

Sense the Input AC, take all necessary calculations and Turn ON Relays 309 and 32 at zero crossing. This is exactly same as in the previous embodiments.

Turn off relays 31 and 33. This is the same step as in previous embodiments. Both relay 309 and relay 32 are actuated in parallel.

Return to Standby Mode (OFF) mode by turning ON relays 31 and 33, perform zero crossing sensing features and switch OFF relays in exactly the same manner as with previous embodiments, e.g. as described with reference to the circuit of FIG. 3.

Figure 7:
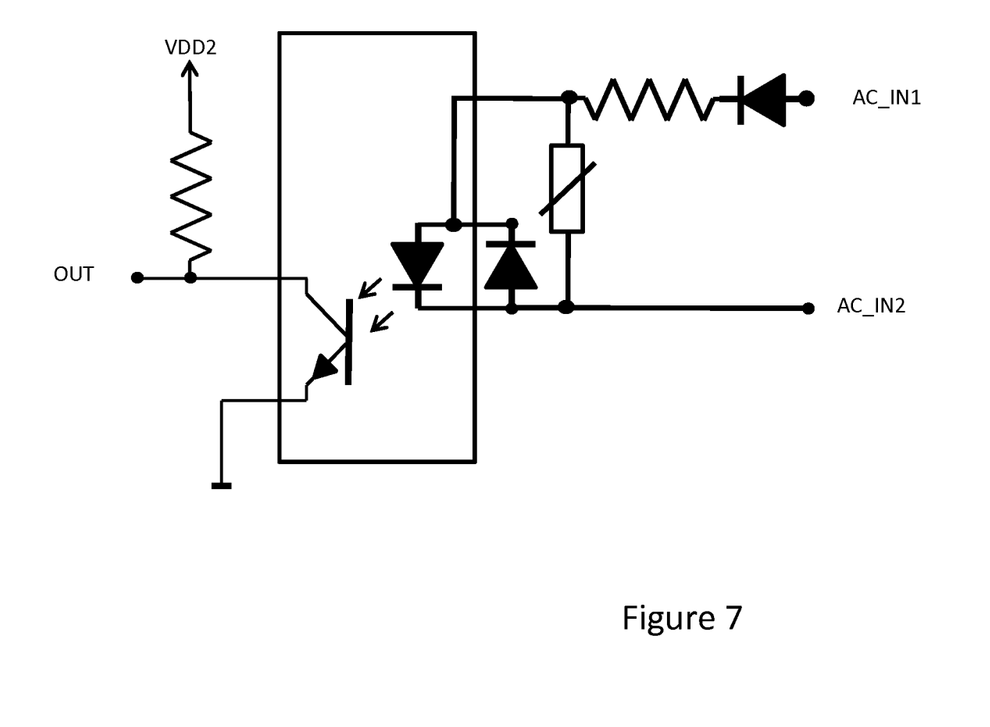
FIG. 7 is a further example of zero crossing detector.

The effect of the circuits of FIGS. 6 and 7 is that when going to Standby Mode, both wires AC L & N, can be switched off/disconnected which means that the reverse connection possibility for some power supply plugs and sockets does not result in current leakages.

The invention claimed is:

1. A display system comprising an assembly of a plurality of display units driven by local power units and a power sequencer control circuit for controlling the power on or off operation of the local power units, the power control circuit controlling power on of the local power units in a sequence to reduce inrush current, wherein power on or off operation of the local power units is by a first relay or switch which is a latching relay, the latching relay being controlled to connect power or disconnect power of an AC power source at or near zero crossing of an AC power signal delivered by the AC power source, further comprising a transducer or sensor for detecting the zero crossing of the AC power signal delivered by the AC power source, the transducer or sensor being connected and dissipating energy only when detection of the zero crossing is required.

2. The display system according to claim 1 wherein in the assembly of display units a local power supply is shared by N display units where N is smaller than M, M being the total number of display units in the assembly.

3. The display system according to claim 1, wherein the system is adapted to send control and data signals to the display units.

4. The display system according to claim 3, further comprising a central processing or control unit which is adapted to send the control and data signals.

5. The system according to claim 2, wherein the ratio of M to N may be 3 or more, 5 or more or 10 or more.

6. The system according to claim 1, wherein the local power units are DC power supplies connectable to and disconnectable from the AC power source.

7. The system according to claim 1, wherein the display units are part of a display wall capable of displaying still and/or moving images or combinations of these.

8. The system according to claim 6, the system being adapted to connect the DC power supply to the AC power source or disconnect the DC power supply from the AC power source at or near zero crossing of the AC power signal delivered by the AC power source.

9. The system according to claim 8, wherein the system being adapted so that the first relay or switch opens or closes to connect the DC power supply to the AC power source or disconnect the DC power supply from the AC power source at or near zero crossing of the AC power signal delivered by the AC power source.

10. The system according to claim 8, wherein the transducer or sensor is adapted for detecting the zero crossing of the AC power signal delivered by the AC power source to the DC power supply.

11. The system according to claim 10, wherein the transducer or sensor is connected to a power supply through a second relay or switch on each electronic device.

12. The system according to claim 11, wherein the system is adapted so that the second relay or switch is closed only at times when zero crossing is to be detected.

13. The system according to claim 11, wherein the second relay or switch is a latching relay.

14. The system according to claim 11, further comprising processing means, the processing means being adapted so that control signals sent to the processing means to signal that the state of the first relay or switch must be changed supply power to the processing means and drivers used to control the first and second relays or switches.

15. The system according to claim 6, further comprising two conductors, each for carrying one of two control signals, a first signal or "Standby" signal on a first conductor signaling that a local DC power supply providing power to an electronic device must be disconnected from the AC power source, a second signal or "Active" signal on a second conductor signaling that a local DC power supply providing power to an electronic must be connected to the AC power source.

16. The system according to claim 15, wherein both signals are voltage signals, a sequence of signals or pulses or waves or a single pulse or wave.

17. The system according to claim 15, wherein both signals are at ground or at a voltage higher than ground.

18. The system according to claim 17, wherein when the first signal is high, it signals that the first relay or switch must be opened, when the second signal is high, it signals that the first relay or switch must be closed.

19. The system according to claim 18, wherein when one of the signals is high, it is used to drive the processing means and the drivers used to control the first and second relays or it can be inputted to a DC voltage regulator that generates a regulated supply voltage and supplies power to the processing means and drivers used to control the first and second relays.

20. The system according to claim 15, wherein each of the conductors carrying either the first or second signal is connected to the input of a regulated power supply.

21. The system according to claim 20, wherein the connection connected to the input of a regulated power supply is by the intermediary of a diode, the diode preventing a short circuit when the first and second signals assume different states.

22. The system according to claim 15, wherein the system is adapted so that the first or second signal is kept high no longer than necessary to put the assembly of electronic devices in standby mode or to bring it out of standby mode.

23. The system according to claim 15, wherein the system is adapted so that when the state of the first relay or switch must be changed, one of the signals is set high and is kept high to power the processing means and the drivers used to control the first relay or switch until the state of the first relay or switch has been changed, whereas when the state of the relay or switch has been changed, both the first and second signals are at ground.

24. The system according to claim 6, wherein the system is adapted so that the time at which a DC power supply associated with an electronic device is connected to or disconnected from the AC power source depends on the state of the DC power supply of at least another electronic device.

25. The system according to claim 24, wherein, the display units have power boards, the first and second signals received by an $i^{th}$ power board can be sent to the $(i+1)^{th}$ power board under control of the $i^{th}$ power board or the first and second signals received by an $i^{th}$ power board can be sent to the $(i+n)^{th}$ power board under control of the $i^{th}$ power board, whereby the value of n is chosen for each board so that finally all are switched on.

26. A method of operating a display system comprising an assembly of a plurality of display units driven by local power units and a power sequencer control circuit for controlling the power on or off operation of the local power units, the method comprising:
  controlling power on of the local power units in a sequence to reduce inrush current, and powering the local power units on or off by operating a first relay or switch which is a latching relay, and
  controlling the latching relay to connect power or disconnect power of an AC power source at or near zero crossing of an AC power signal delivered by the AC power source,
  wherein a transducer or sensor is used for detecting the zero crossing of the AC power signal delivered by the AC power source, the transducer or sensor being connected and dissipating energy only when detection of the zero crossing is required.

* * * * *